E. P. BULLARD, Jr. & W. N. STEVENS.
AUTOMATIC MACHINE TOOL.
APPLICATION FILED JAN. 9, 1914.

1,258,089.

Patented Mar. 5, 1918.
11 SHEETS—SHEET 1.

Witnesses
Inventors
Edward P. Bullard Jr.
and William N. Stevens
By Chamberlain & Newman
Attorneys

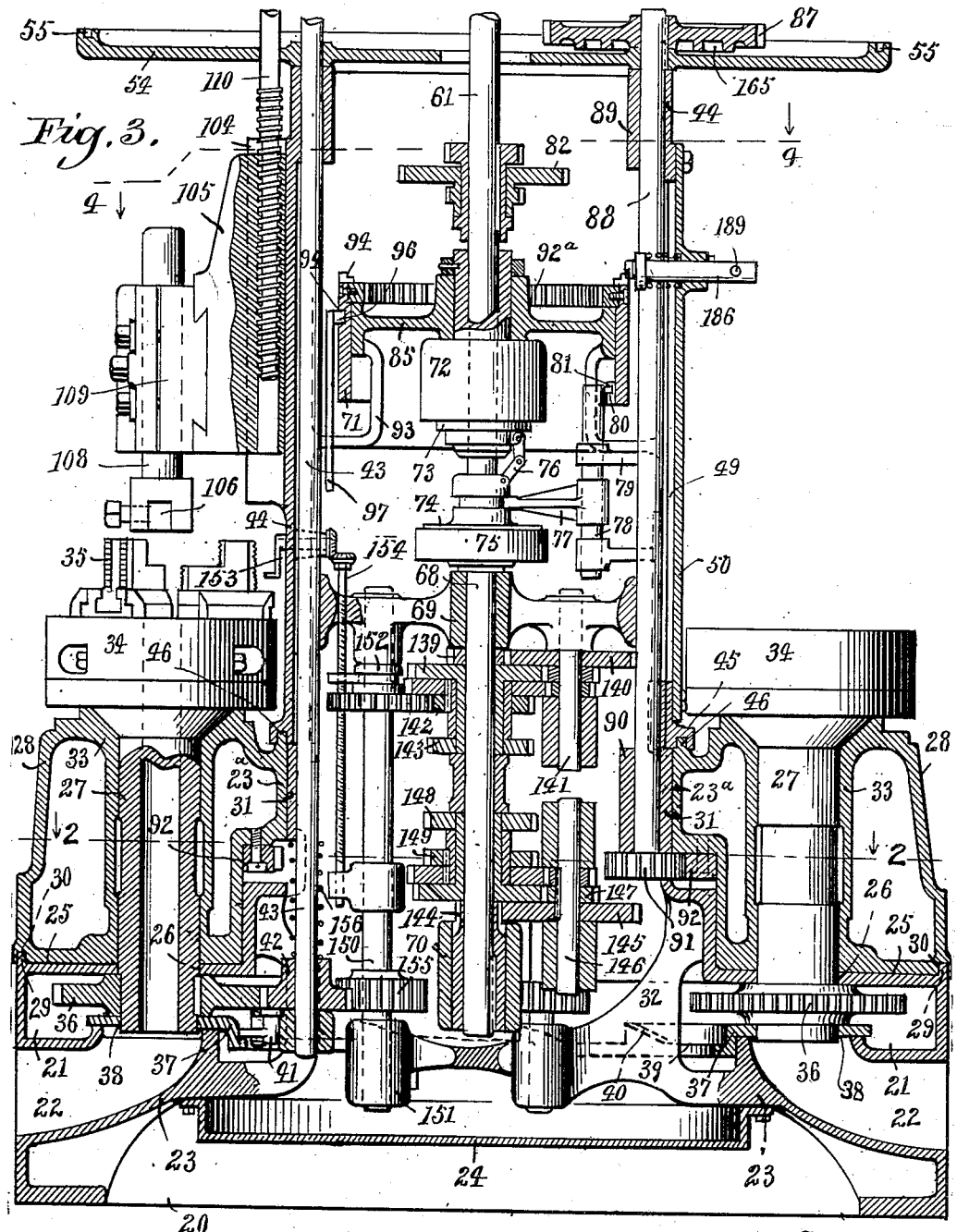

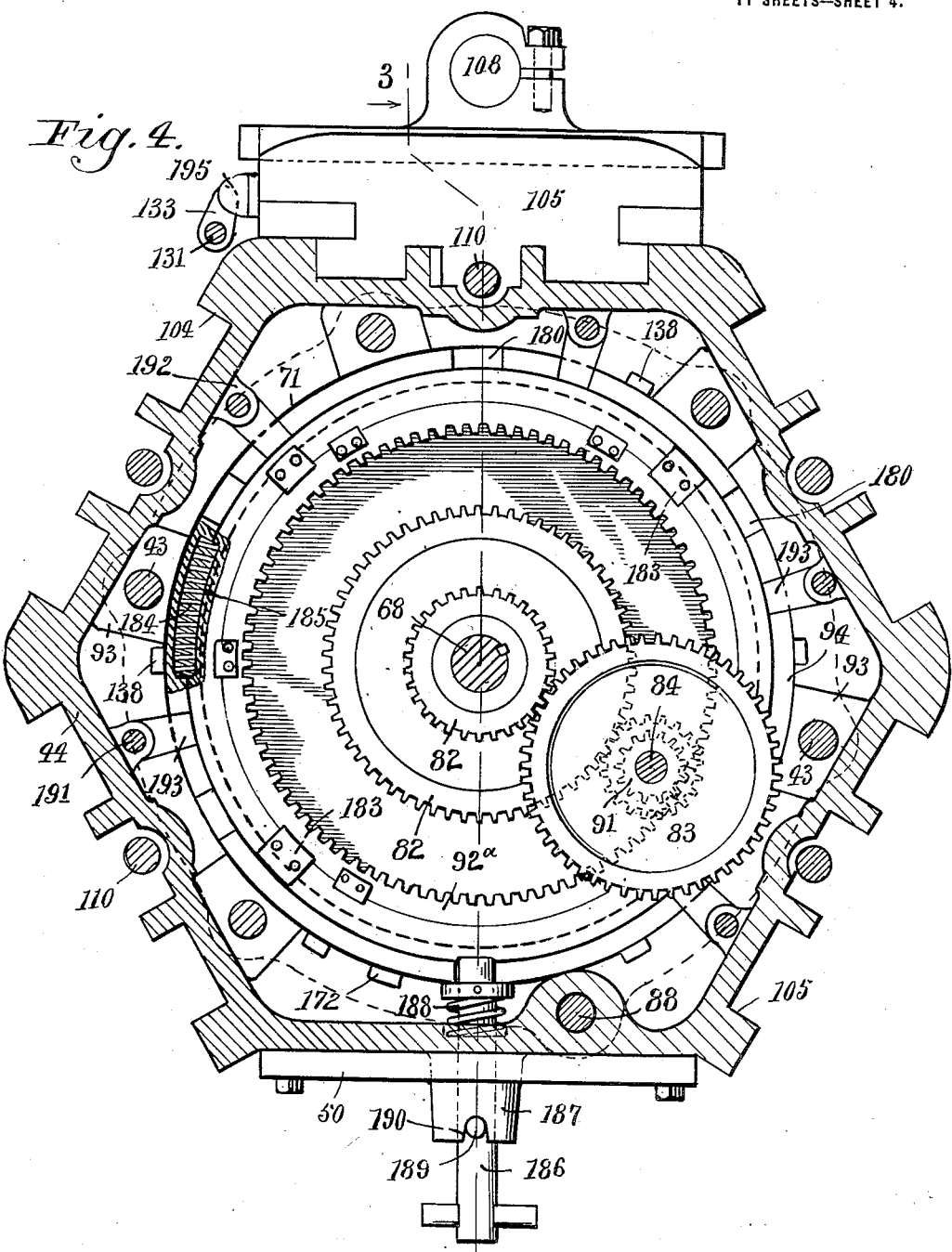

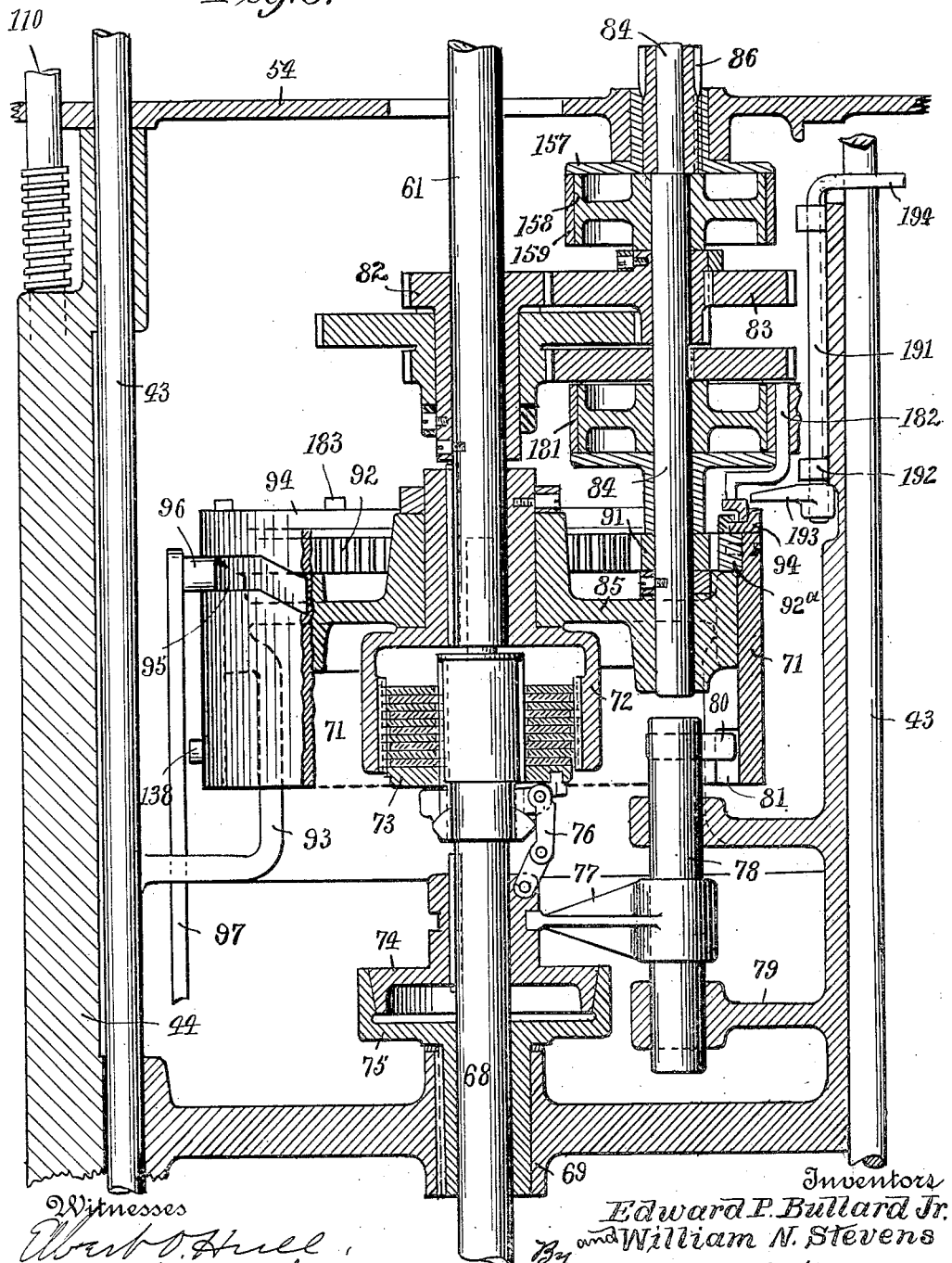

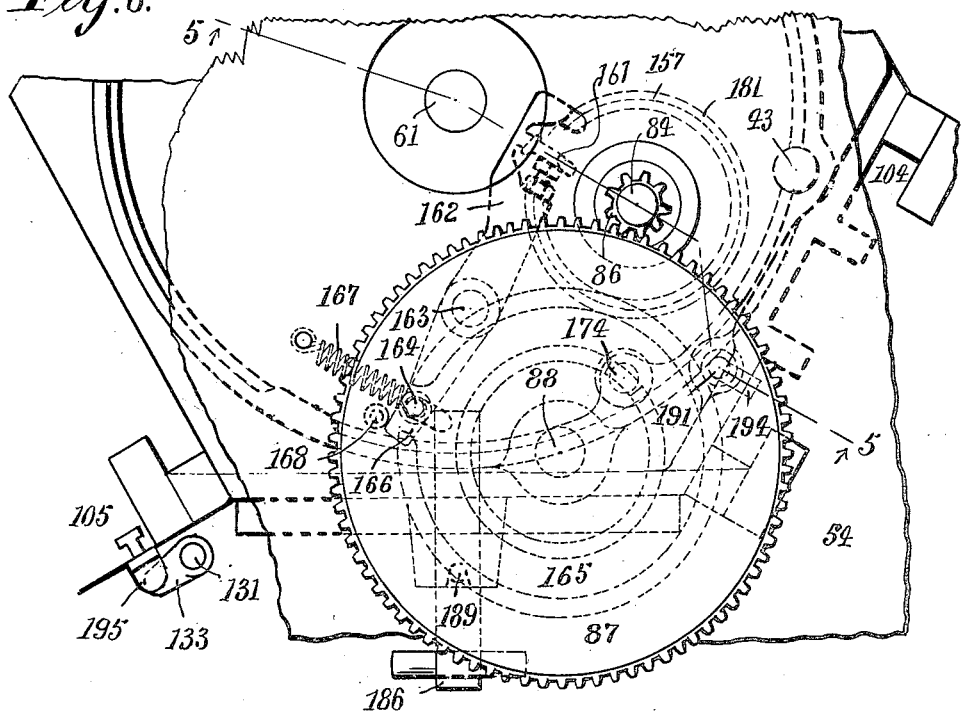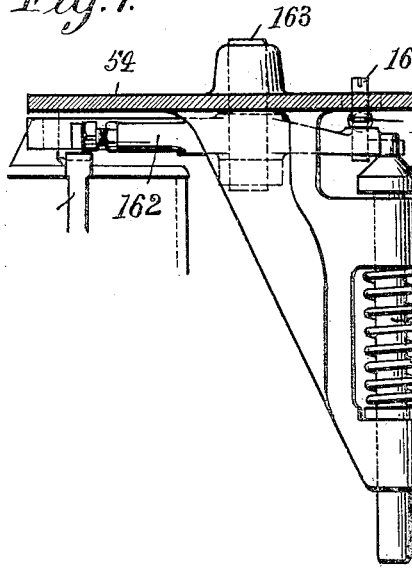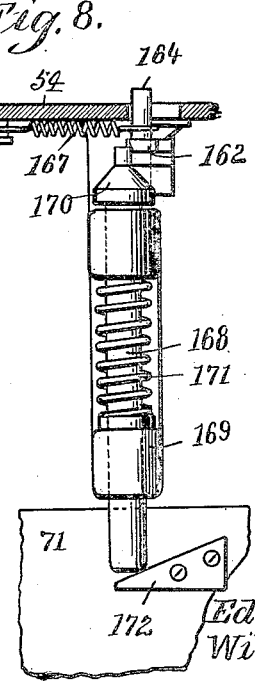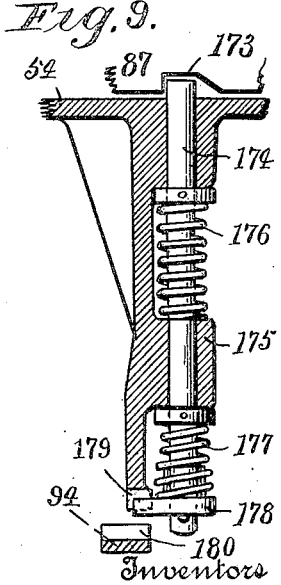

E. P. BULLARD, Jr. & W. N. STEVENS.
AUTOMATIC MACHINE TOOL.
APPLICATION FILED JAN. 9, 1914.

1,258,089.

Patented Mar. 5, 1918.
11 SHEETS—SHEET 7.

Witnesses

Inventors
Edward P. Bullard Jr
and William N. Stevens
By Chamberlain & Newman
Attorneys E. P. BULLARD, Jr. & W. N. STEVENS.
AUTOMATIC MACHINE TOOL.
APPLICATION FILED JAN. 9, 1914.

1,258,089.

Patented Mar. 5, 1918.
11 SHEETS—SHEET 9.

Witnesses
Inventors
Edward P. Bullard Jr.
and William N. Stevens
By Chamberlain & Newman
Attorney

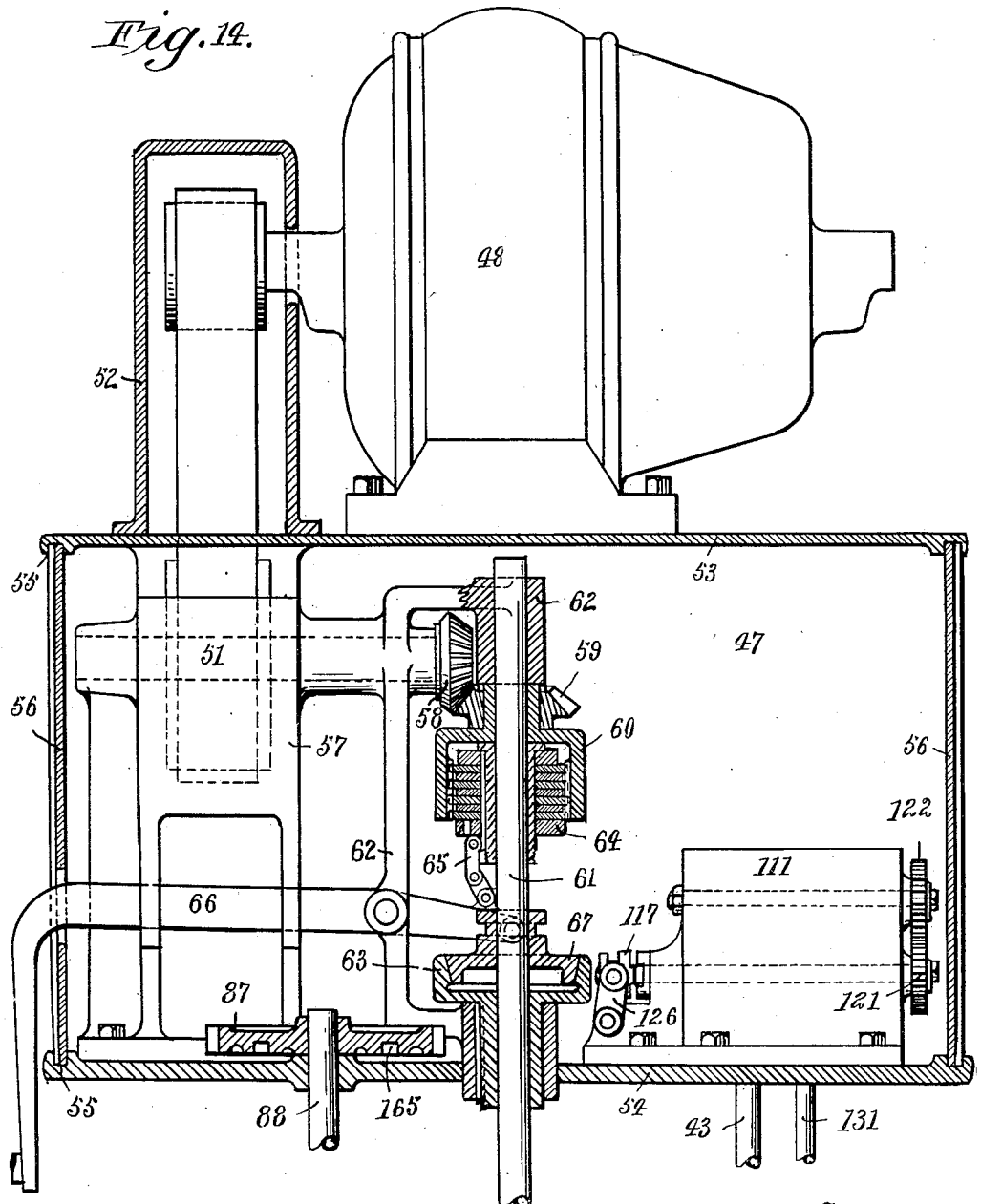

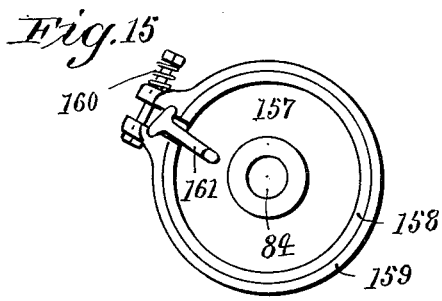
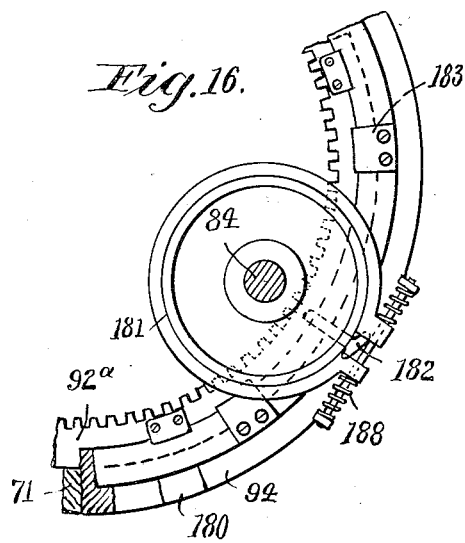
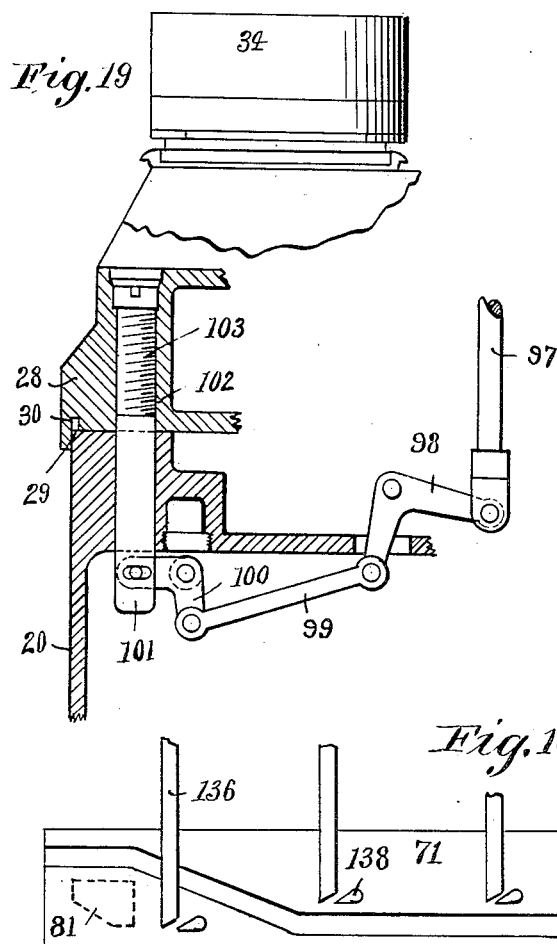
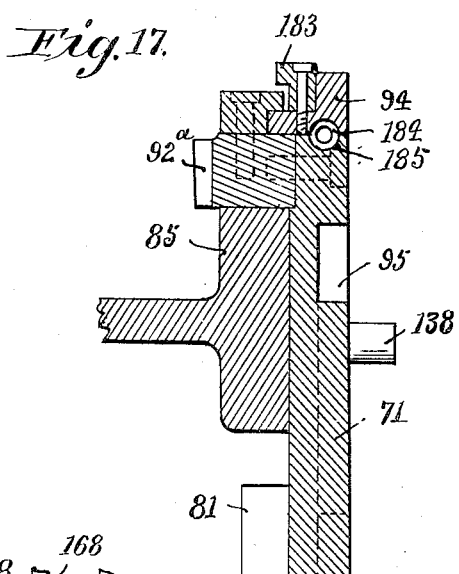
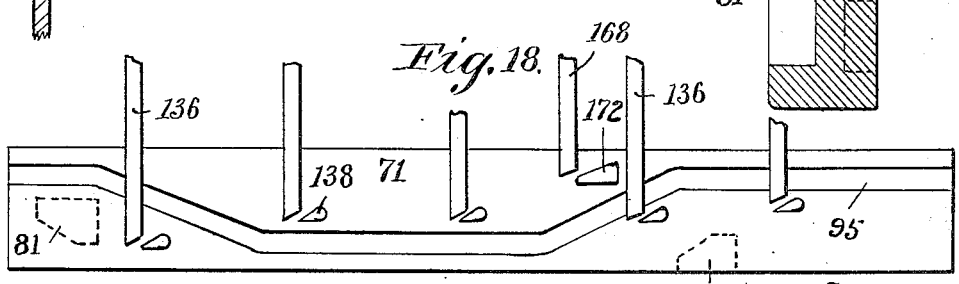

UNITED STATES PATENT OFFICE.

EDWARD P. BULLARD, JR., AND WILLIAM N. STEVENS, OF BRIDGEPORT, CONNECTICUT, ASSIGNORS TO THE BULLARD MACHINE TOOL COMPANY, OF BRIDGEPORT, CONNECTICUT, A CORPORATION OF CONNECTICUT.

AUTOMATIC MACHINE-TOOL.

1,258,089. Specification of Letters Patent. Patented Mar. 5, 1918.

Application filed January 9, 1914. Serial No. 811,198.

*To all whom it may concern:*

Be it known that we, EDWARD P. BULLARD, Jr., and WILLIAM N. STEVENS, citizens of the United States, and residents of Bridgeport, in the county of Fairfield and State of Connecticut, have invented certain new and useful Improvements in Automatic Machine-Tools, of which the following is a specification.

This invention relates to improvements in automatic machine tools and refers especially to a multiple spindle form of boring and turning machine which is adapted to handle a large variety of work and is especially constructed to automatically perform a series of different operations simultaneously upon a series of like pieces so that a piece may be completed upon the machine without rechucking or otherwise changing the piece.

*Introductory.*—The object of the invention is to design a machine tool which will be automatic in every particular and which will be adapted to quickly handle a large variety of work; to design the machine so as to have a series of machines in one and whereby they will perform their respective operations simultaneously; to construct a machine upon which a piece of work requiring a series of operations, may be automatically turned out complete and without resetting the piece upon the machine; to provide a machine of the class specified which will include a multiplicity of work carrying spindles and a multiplicity of tool carrying heads mounted with respect to the said spindles and so as to work in conjunction therewith; to thus provide a machine wherein there will be a series of rotary work carrying tables any of which may be used for loading purposes during which time they may be caused to stand still if desired, and a series of tool carrying heads; to provide means for operating the spindles at either uniform speed or independent separate speeds and likewise to provide different feeds for the slides that work in conjunction with the respective tables.

Our invention further resides and consists in the novel construction, arrangement and combination of parts shown upon the accompanying drawings forming a part of this specification and upon which, Figure 1, shows a front perspective view of our new design of machine tool.

Fig. 3 shows a central vertical section through the lower portion of the machine more especially the base, carrier, spindles and mechanism for driving same and taken on line 3—3 of Figs. 2 and 4.

Fig. 4 is a horizontal section through the intermediate portion or column of the machine and taken on line 4—4 of Fig. 3.

Fig. 5 is an enlarged central vertical sectional view through the intermediate portion of the machine and taken on line 5—5 of Fig. 6.

Fig. 6 is a further detail plan view of the top portion of the inside of the machine showing the indexing gear and mechanism for operating the indexing and controller clutches 157 and 181 respectively.

Figs. 7 and 8 show enlarged front and side views respectively of the lever and clutch mechanism shown in Fig. 6 for clamping and releasing the indexing clutch 157.

Fig. 9 is a similar side view of a stop mechanism that is operated by the controller drum to engage the indexing gear 87.

Fig. 14 shows a sectional elevation through the extreme upper portion of the machine illustrating the motor drive and its operative connections with the main driving shaft.

Fig. 15 shows a detail bottom plan view of the upper or controller clutch 157 for operating the controller drum shown in Fig. 5.

Fig. 16 is a detail top plan view of the lower or controller ring clutch and portion of ring, drum and rack shown in Fig. 5.

Fig. 17 is an enlarged detail cross section of portion of controller, drum, rack, &c.

Fig. 18 is a diagram view of face of controller drum showing cam groove, lugs, and rods operated thereby.

Fig. 19 shows a detail sectional elevation of locking device for carrier, operated from controller drum.

Figure 1:
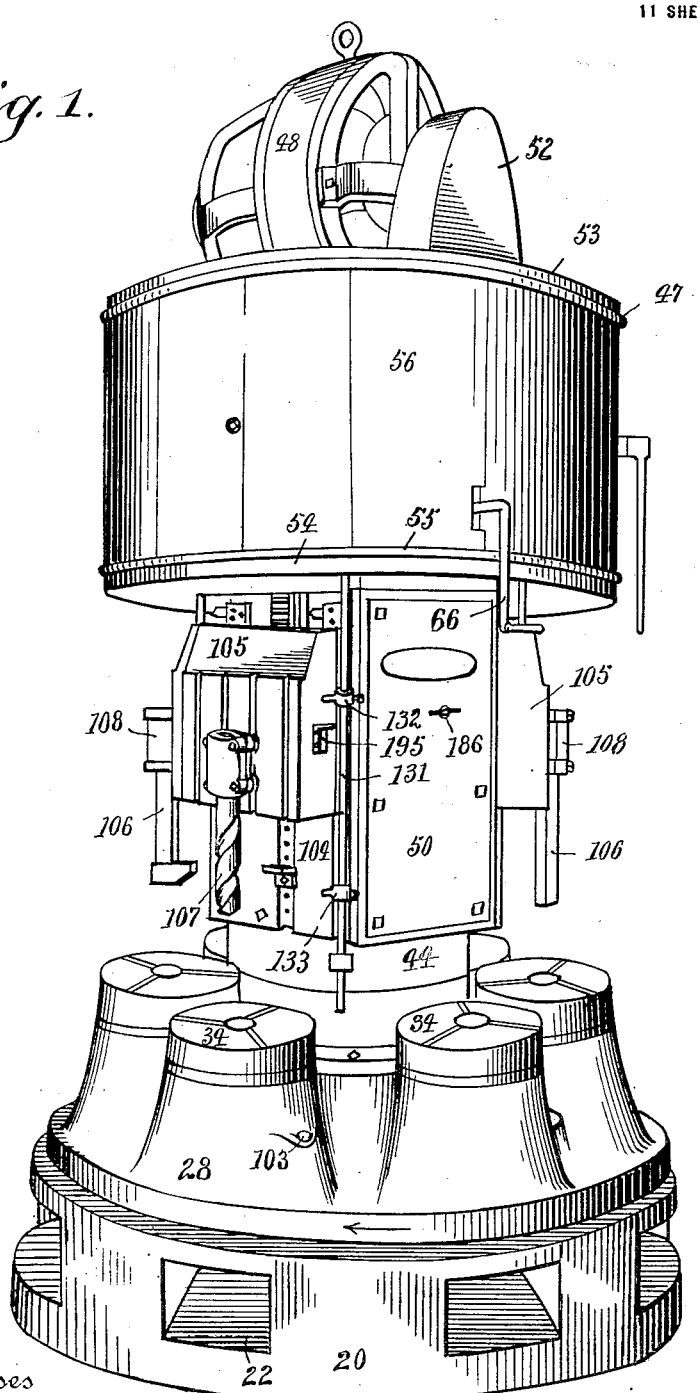

*General.*—The machine is designed to be operated by one or more attendants who are in position to reach the several levers and controlling devices and likewise in position to put on and remove the work from the tables when the machinery operations are complete. As the respective tables come forward they now become idle and remain idle while being reloaded when they are carried around to their several operative positions. The table thus selected usually stationed at the front stands idle, while the other tables are rotating and performing their work in conjunction with the cutting tools carried by the slides arranged above them. The tables are rotatably mounted in the carrier which moves successively so as to bring the tables beneath the respective operating tool carrying slides and as shown requires six movements of the carrier to make one complete turn upon the base. In this connection it may be stated that with our improved machine the time required for machining a given piece is the time of the longest operation plus such time as is required for indexing the carrier from one position to another.

The novel machine briefly includes a base that supports a hollow column and upon the top of which is built an inclosure for the driving mechanism and feed works. A rotary carrier is also mounted upon the base and is designed to be turned upon the base so as to carry the rotary spindles and work carrying tables around the column. The said carrier is moved successively a predetermined distance with each movement so as to carry the rotary tables from one point of operation to another. The mechanism as constructed causes the carrier to make six stops equal distances apart with each complete rotation. Each movement and stop of the carrier brings five of the rotary tables under the same number of tool slides and in proper position to operate in conjunction therewith. The machine is preferably driven by an electric motor situated on the top of the machine so as to drive the several parts through a central driving shaft.

*Base.*—Referring in detail to the characters of reference marked upon the drawings 20 represents the base of the machine which as will be noted is formed of a single casting and in a general circular shape to form a central vertical opening therethrough in which a large part of the mechanism of the machine is contained. An annular pocket 21 is formed in the base to accommodate the gears 36 of the table spindles. Beneath this pocket is formed a series of inclined outlet passages 22 which serve to direct the chips out through the machine and upon the floor as they fall through the hollow spindles from the tables. To the under and inner portion 23 of the base is secured a pan 24 which serves to inclose the bottom of the machine and form an oil pocket to catch the drippings from the bearings. The said base is further shaped to form an annular flat bearing surface 25 and through which is formed an annular opening 26 to accommodate the table spindles 27 mounted in the rotary carrier 28. An upwardly disposed annular rib 29 is formed on the outer edge portion of the base to fit into a groove 30 in the under outer edge portion of the carrier to form a closed bearing between the two parts. The inner annular cylindrical portion 31 of the base is supported from the main base through upwardly disposed arms 32. In these arms are formed bearings to accommodate the several vertically disposed shafts as will later be more specifically referred to.

*Carrier.*—The carrier 28 is of a general annular shape and includes an annular bottom that fits and rides upon the surface 25 of the base, while the inner cylindrical walls 23ª of the said carrier are fitted to and rotate around the vertically disposed wall 31 of the base. A series of vertically disposed openings forming spindle bearings 33 are also formed in the casting comprising the carrier and serve to support the spindles 27 before mentioned. In practice there are six of these spindles arranged at equal distances apart and upon the upper end of each is formed a rotary work carrying table 34 that carries suitable chucks or fixtures 35 for holding the work to be operated upon.

*Spindles.*—The spindles 27, before mentioned, are hollow and thus serve to permit the fine chips which are cut from the work to drop through and into the chutes 22 and slide out from the base of the machine. Large gears 36 are mounted upon the lower end of each of the said spindles and are connected to be driven by other gears so as to drive the spindles and tables and to rotate the work when mounted upon the tables.

*Cam ring.*—A cam ring 37 is mounted upon the annular bearings 23 of the base and is provided with holes 38 to receive the lower ends of the spindles 27 so as to move the ring around upon the base and with the carrier. The ring further includes a depending annular flange which forms an annular cam track 39 that includes suitable cam lugs 40 to engage pins 41. These pins serve to raise the gears 42 slidably mounted upon the shaft 43 and to allow the spindle gears to be moved forward and in line for mesh with the said slide gears when the carrier moves from one station to another.

*Column.*—A cylindrical column 44 is secured to the upper portion of the cylindrical wall 31 of the base and is provided with a grooved flange 45 to cover the annular rib 46 on the top edge of the carrier wall 31. This column serves to inclose important mechanism of the machine and also carries the housing 47 and motor 48 located above. An opening 49 is formed in the front of the column and is so arranged as to permit of access to the controller drum and other operative parts located therein. Said opening being normally closed by a removable plate 50 that is attached by screw bolts as shown.

*Motor drive.*—The motor 48 for driving the machine is preferably mounted upon the top of the machine and as arranged is belted to drive a pulley and short cross shaft 51 inside of the housing 47 forming the upper inclosure of the machine. The said pulley and belt are covered by a hood 52 that is secured to the top 53 of the housing before mentioned. 54 represents the bottom or flooring of the said inclosure and as will be seen is supported upon the top of the column 44. The said top 53 and bottom 54 of the housing are each provided with an annular groove 55 in their outer edge portion to accommodate a series of sheet metal closure plates 56, that are adapted to slide backward and forward alongside of each other in the said annular grooves, so that access may be readily had to any portion of the inclosure whereby the compartment may be kept shut inclosing the mechanism contained therein.

*Driving connections.*—The short shaft 51 is journaled in a bracket 57 supported between the plates 53 and 54 and is provided with a bevel gear 58 upon its inner end that meshes with and drives a similar gear 59 upon the hub of one member 60 of a friction clutch that is arranged to run free upon the upper central vertical driving shaft 61. The upper end of this driving shaft 61 is journaled and supported in an arm 62 of the bracket 57 while the lower part is journaled in the hub of a brake member 63. The before mentioned clutch member 60 which is loosely mounted upon a shaft 61 is designed to operate in connection with a slidable member 64 keyed to the same shaft, and is adapted to be operated through link connections 65 with an operating lever 66 that extends out through the inclosure 47 and is adapted to be manually operated when it is desired to operatably connect the said shaft with the motor. The movable member 67 of the brake is also slidably mounted upon the said shaft 61 and is connected to be operated by the same lever 66 and simultaneously with the operation of the slidable clutch member 64.

*Clutches for driving shaft.*—The vertical shaft 61 forms the upper main driving shaft and 68 represents the lower shaft, said lower driving shaft being in alinement with the upper shaft and journaled in a bearing 69 secured to the column and in a lower bearing 70 secured to the base. These upper and lower driving shafts are adapted to be connected through a clutch shown in Figs. 3 and 5, and which is automatically operated by connections with the controller drum 71 as shown in said figure and as will again be referred to. This clutch like the clutch 64 before referred to is connected to a brake 74 that is simultaneously operated. The upper member 72 of this clutch is keyed to the lower end of the upper shaft 61, while the slidable clutch member 73 is keyed to the upper end of the lower shaft 68. 74 represents the sliding member of the brake and 75 the fixed member of the brake. As shown, these two sliding members are connected by links 76 and are adapted to be operated through the arm 77 and slide rod 78 which latter in turn is engaged to be raised by the cam lugs 81 on the inside of the cylindrical controller drum 71. The arm 77 secured to the slide rod is engaged by a groove in the movable member 74 of the brake. The rod 78 is movably mounted in brackets 79 extended inward from the column, and in the upper end of the rod is secured a pin 80 that is disposed outward in line with the movement of the cam lugs 81 upon the inside of the controller drum 71 so that with each complete rotation of the controller drum the said cams will engage the pin to raise and lower it for the operation of the clutch and brake, thereby insuring the clutch being opened and closed once with each complete turn of the drum for the purpose of connecting and disconnecting the two said shafts once with each turn of the drum and one-sixth turn of the carrier. The lower one of the said driving shafts, as before stated, is operatively connected with the respective table spindles which have to be started and stopped every time that they assume their operative positions.

*Driving machine for carrier.*—The rotary carrier 28 mounted upon the base is driven from the upper driving shaft through speed reducing gears 82 mounted upon the said shaft 61 and co-acting gears 83 mounted upon a clutch shaft 84, see Figs. 4 and 5, journaled in the bottom plate 54 of the upper inclosure and in a bearing plate 85 arranged central of and supported from the column. Upon the upper end of this clutch shaft is secured a small pinion 86 that meshes with and drives a large indexing gear 87 mounted upon the upper end of the vertically arranged indexing shaft 88, journaled in the bearing 89 of the column and 90 of the base. Upon the lower end of this shaft 88 is mounted a pinion 91 that meshes with an internal gear 92 secured to the inner cylindrical wall 31 of the carrier for the purpose of turning the same to move the spindles and tables from one operating station to another.

*Controller drum and bracket.*—The controller drum 71 is cylindrical in form and is mounted to turn upon a special form of bearing plate 85 that is supported upon arms 93 on, and centrally within, the before mentioned column 44. The internal gear 92ª which is secured to the upper edge portion of the controller drum 71 serves also to bear upon the upwardly disposed flange portion of the said bearing plate to further support the controller drum in its operative position upon the plate. This drum is designed to be turned upon the plate through the pinion connections with the rack before mentioned for the purpose of operating the several parts of the machine and in a way serves as a means for controlling the operation of the machine. Upon this drum 71 is also mounted a controller ring 94 which we will refer to later.

*Stop for carrier.*—We have also provided connections for this controller drum 71 to the carrier 28 whereby the latter is at proper times automatically locked in its respective operative positions see Figs. 3, 5, 16 and 17. It will be noted that we have provided a cam groove 95 in the outer face of the controller drum that serves to guide a roller pin 96 mounted upon the upper end of a rod 97 so that the same will be raised and lowered a given distance with each turn of the drum. In practice this drum makes one complete turn to one-sixth turn of the carrier, or in other words, the drum makes six revolutions to one revolution of the carrier. Therefore, with each complete turn of the drum the said rod and its connections are raised and lowered to their limit. From Fig. 19 it will be seen that this connecting rod 97 is pivotally connected to one end of a bell crank lever 98 hung upon the base and to the other end of which lever is pivotally connected a link 99. The latter link is further pivotally connected to a second bell crank lever 100 that is pivotally and slidably connected to a lock pin 101 mounted in the base to be raised and lowered for engagement with the several holes 102 in the under side of the carrier. Adjustable screws 103 are set into each of these holes and serve to be engaged by the said lock pin arranged in the outer base portion of the carrier. The purpose of this line of connection is to automatically release the carrier when it is time for it to move from one operating station to another, and likewise to insure the engagement of the said stop pin with one of the pins and sockets or holes in the carrier when it is brought around and made to register therewith.

*Tool slides.*—The central portion of the outside of the column is of a general hexagon shape having six slides. The front side is covered with the before mentioned removable plate 50 while the remaining five slides are provided with ways 104 in which the operating slides 105 are supported. These ways and slides and mechanism for operating the slides are alike in construction and therefore the same reference characters will be used to refer to like parts in each of the five sets. It will be obvious, however, that the detachable tools 106 and mechanism for supporting the tools may vary according to the particular class of work to be done, as for instance in Fig. 1, we have shown a drill 107 located central above the operating table 34 and which in that case would be used to perform the first work upon the piece to be mounted on the table and which would bore a hole in said piece. In Fig. 3 we have shown a tool holder 108 carried in a cross slide 109 that may be used for either inside or outside surface cutting. Different tools set differently, would probably be used on part or all of the slides so as to perform all necessary operations on a single piece. This obviously allows for a large variety of work and allows for boring and threading and turning of either inside or outside cylindrical surfaces. The machine is thus particularly adapted to completely finish pulleys, fly wheels and gear blanks as well as an unlimited variety of castings and forgings requiring operations of the above class.

Figure 11:
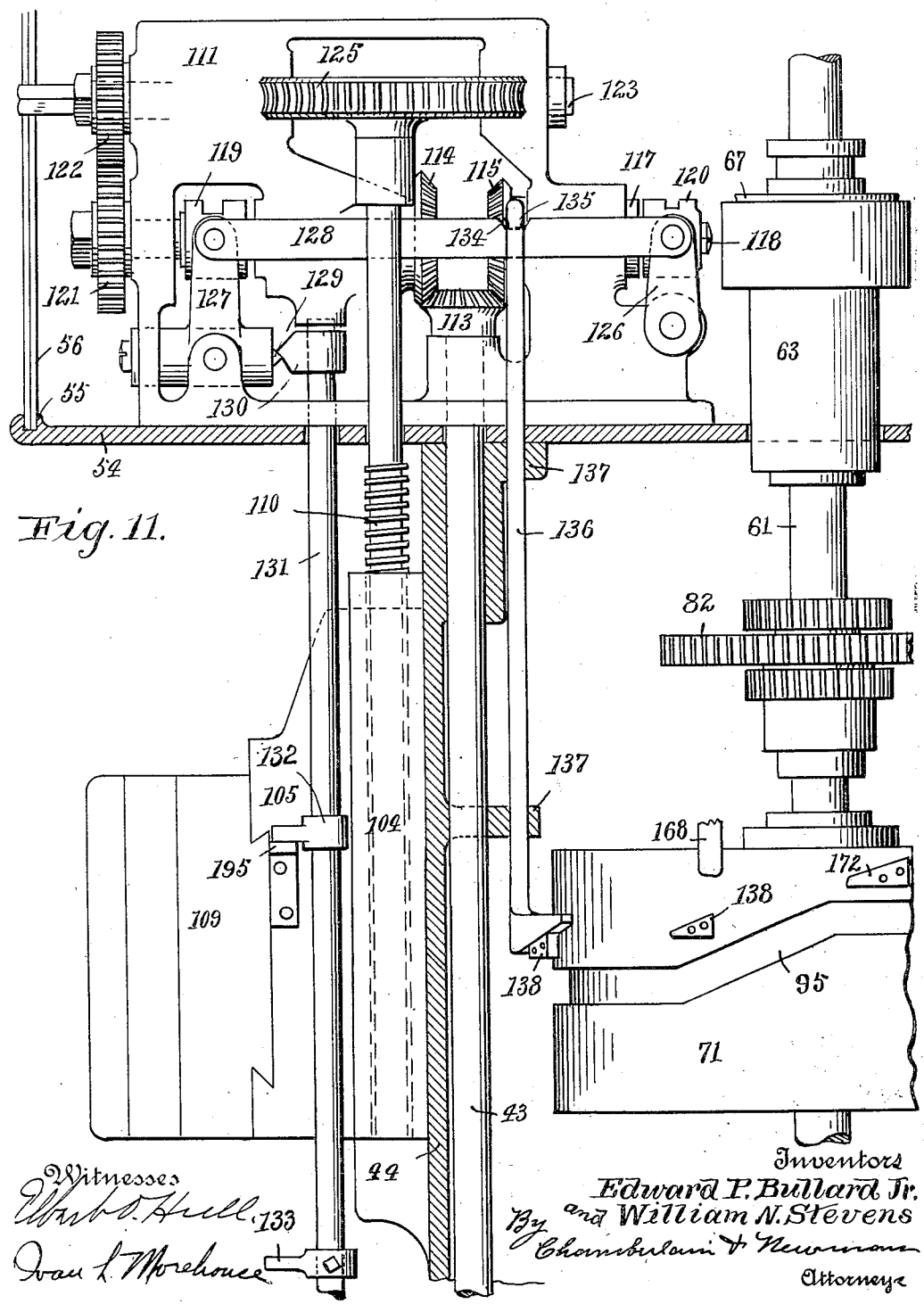
Fig. 11, shows a sectional elevation of an enlarged scale of one of the feed works and connected parts.
Figure 12:
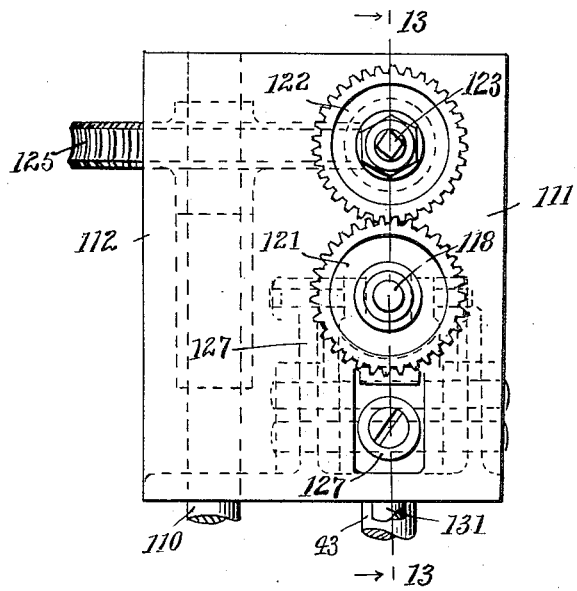
Fig. 12 shows an end view of the same feed works shown in Figs. 10 and 11 for operating the feed slides.
Figure 13:
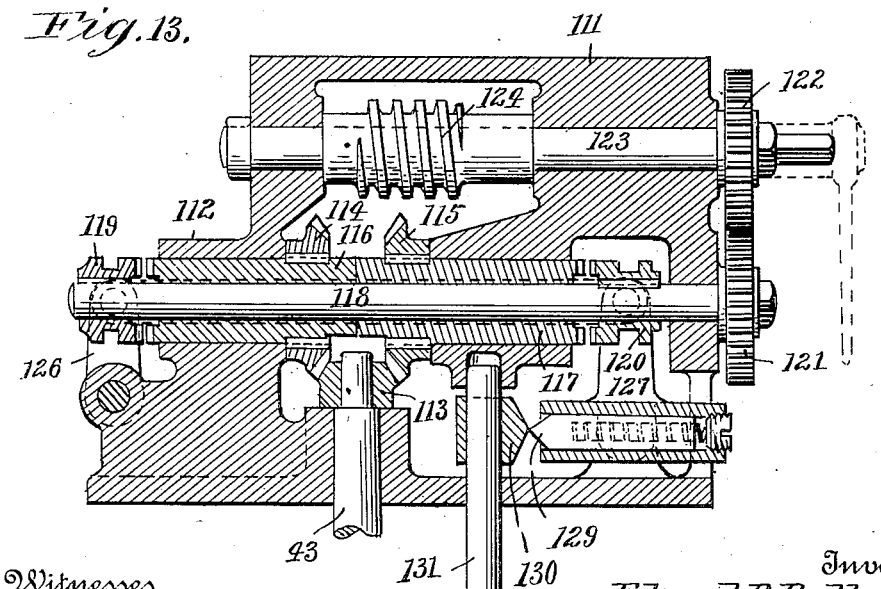
Fig. 13 is a central vertical longitudinal section through the said feed works taken on line 13—13 of Fig. 12.

*Reversing feed works.*—These tools and slides are fed up and down as required through a feed screw 110 (see Figs. 3 and 11), which screw is operated from the reversible feed works 111 of which there is one set for each slide. These feed works being alike in construction we will describe in detail but one set and will call attention to Figs. 10, 11, 12 and 13. They are each operated from the respective vertical shafts 43 which are journaled in the column as shown and extend up through the bottom plate 54 and into the casing 112 of the feed works 111. A small bevel pinion 113 is secured to the upper end of the shaft 43 which pinion meshes with similar pinions 114 and 115 one of which is secured to a clutch sleeve 116 and the other upon a similar clutch sleeve 117. These sleeves are both movably operated in bearings of the casing 112 and have a shaft 118 journaled in them. The ends of both of these sleeves are provided with a clutch face that is adapted to be engaged by clutches 119 and 120 keyed to the said shaft and adapted to be slid backward and forward so as to alternately engage and disengage the clutches of the sleeves 116 and 117 and cause the shaft to be driven either backward or forward as desired. On the end of the shaft 118 is mounted a gear 121 that meshes with a similar gear 122 upon an upper worm shaft 123 also journaled in the casing and bearing a worm 124 which drives a gear 125 secured to the upper end of the feed screw 110 before mentioned that operates to raise and lower the slide 105.

These clutch members are operated by the slides 105 through connections with a rocker arm 126 and a bell crank lever 127 that are pivoted to the casing and connected together by a link 128. The said bell crank lever is connected with the clutch 120 and provided with a bore in which is mounted a spring actuated pointed pin 129 that is engaged by a cam lug 130 that extends down and out through the flooring 54 and along side of the respective slides 105. Upon the outer portion of this rod 131 is secured an upper arm 132 and a lower arm 133 that are adjustable up and down thereon and extend out in line with the path of movement of a stop 195 upon the slide so that when the slide reaches the end of its movements its stop will engage one or the other of the arms and force the rod up or down and shift the clutches. It will thus be understood that when the slide reaches the end of its downward movement it will strike the lower arm 133 and thus draw the rod down in a manner to shift the bell crank lever upward and the clutches to the right in a way to throw in the reverse or upward feed and cause the slides to return to their upper positions. When the slides thus independently operating return to their upper position they will in a like manner engage the upper adjustable arm 132 on the trip rod in a way to again shift the bell crank lever and clutch connections to disengage the said upward feed. We here provide means for holding the clutches in a neutral position so as to prevent the immediate engagement of the feeding mechanism for the downward feed of the slides and which we will refer to again later. These operations of the several slides are, of course, independent one from the other as the different cuts which the tools of the several slides may vary, some requiring deeper cuts and longer movements of the slides than others. This is obviously taken care of at the time the first piece is put on the machine by adjusting the lower arm 133 so as to cause it to be struck sooner or later as the occasion requires. While the slides start to return upward at various times for the reason just mentioned, yet this is not true of their downward start as they all must start together so that the cycle of operations will be maintained throughout. Therefore this down feed of the slides like the other operations in the cycle of movements of the machine is governed from the controller as follows:

In the top edge of the link 128 is formed a notch 134 that is engaged by a tooth 135 formed upon the upper end of a stop rod 136 which is mounted in guides 137 formed in the column and serves to hold the link and connected parts in an intermediate position when the same is shifted over as a result of the tripping of the rod 131 at the extreme of the upward movement of the slide as before mentioned. The link being thus engaged serves to hold the clutches in a disengaged position until automatically released through the rod 136 which extends down into the column in position to be engaged by a lug 138 on the controller drum, in a way to raise the same when engaged by the pin. This upward movement of the rod disengages the tooth from the notch of the link in a way to release the same and allow the clutch 119 of the feed works to throw in and start the slide down. In this connection it will be seen that the controller drum is provided with five of these lugs 138 each of which is spaced at an equal distance apart thus serving to operate each of the five rods 136 at the same time thereby throwing all five of the feed works simultaneously, so that they all start feeding together.

Figure 2:
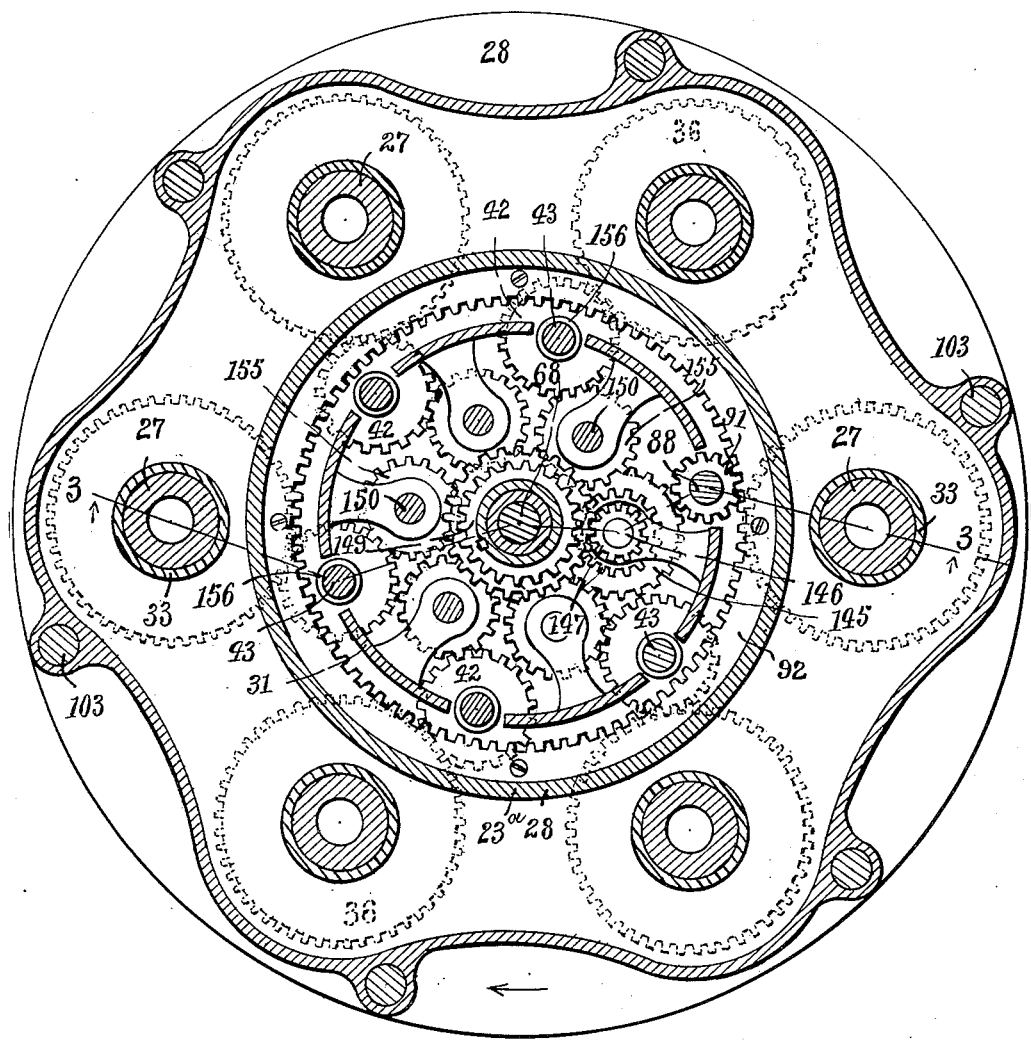
Fig. 2 is a transverse horizontal section taken on line 2—2 of Fig. 3 and showing the gear driving mechanism for carrier, spindles, &c.
Figure 10:
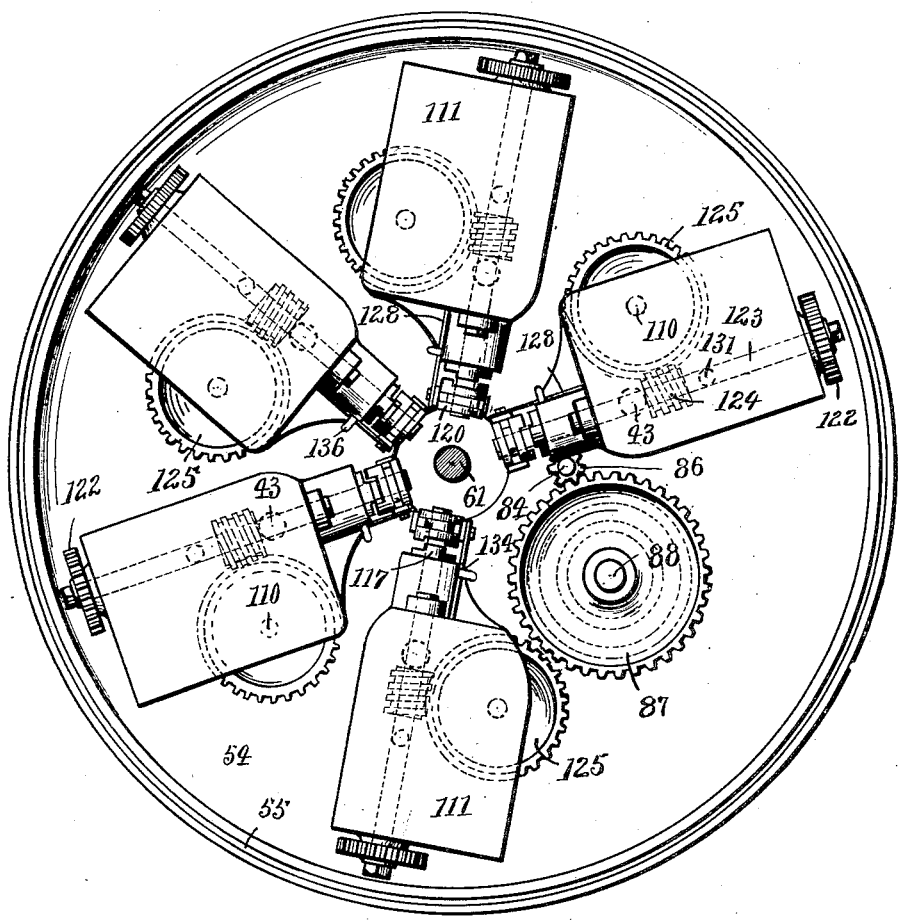
Fig. 10 is a plan view of the inside of the upper portion of the machine illustrating the inclosed casing and feed mechanisms for operating the several slides and also showing the indexing shaft and gear therefor.

*Variable spindle drive.*—The table spindles 27 are all driven from the lower driving shaft 68 and are each provided with separate, but like variable speed driving mechanisms so that the tables may be driven at four different speeds with relation to the said main shaft as will be best understood from Figs. 2 and 3. Upon this lower driving shaft is mounted a gear 139 that meshes with and drives a gear 140 on a short shaft 141 carrying two smaller gears and which serves to drive the gears 142 and 143 on the main shaft at different speeds. The lower end portion of the shaft 68 is provided with a gear 144 that drives a large gear 145 on a short shaft 146. This gear 145 through said shaft and small gears 147 drives the gears 148 and 149 at different speeds. An intermediate shaft 150 that is journaled in the before mentioned stationary bearing 69 and a lower bearing 151 has mounted thereon a slide gear 152 that is operated up and down to engage either of the gears 142, 143, 148 and 149 so that it and its shaft may be operated at either speed desired. The sliding gear is manually operated by an operating handle 153 that is geared to rotate a screw shaft 154 threadably connected with an arm of the sleeve formed on the hub of the said gear 152. A broad faced gear 155 secured to the lower end of the shaft meshes with and drives the slip gear 42 keyed to the vertical shaft 43 journaled in the base and column. A spring 156 serves to hold this slip gear down to mesh with the spindle gears 36 when they are in their operative position under the slides. This slip gear is automatically raised to disengage the spindle just as the carrier begins to move or index by its pin connection with the cam ring 37 before mentioned. This gear is raised during the movement of the carrier so as to allow the spindle gears 36 to pass the next slip gear and so that said slip gear may be dropped to mesh therewith from above when indexing is completed.

From the foregoing it will be seen that each tool carrying head is operated through the same shafts 43 and gear 42 with which the table spindles are operated and that while the speeds may be changed and varied, yet all operations of the tool heads and spindles are in relation with the tables with which they are engaged and are fed synchronously with such tables with which they are engaged. This makes it possible for each tool head to cut an exact thread of any required pitch within its range on work held on the table and will repeat this operation on any table brought to that station or tool head.

*Upper clutch.*— The upper or indexing clutch 157 upon the shaft 84 includes a drum 158 fixed to the shaft and a band 159 that encircles the drum and which is normally held clamped around the drum by springs 160 and is designed to be spread apart by a lever 161 that fits between the ends of the said band and is carried therewith. This lever is caused to register with and be operated by a lever 162 with which it strikes said lever being pivoted to a stud 163 secured to the under side of the floor plate 54. A pin 164 is carried in the other end of the lever and extends up through the floor plate 54 to engage the groove 165 in the under side of the driving gear 87 so as to normally hold this end of the arm in and the clutch band open. The outer wall of this groove is provided with an opening 166 so as to allow the pin 164 to be drawn out, and the lever 162 to be operated by the spring 167, when the gear makes a complete turn and the opening 166 comes to register with the said pin. This connection of pin 168 with the wall of groove normally holds the clutch open, but insures its release and engagement with the shaft at the proper instant to start the drive of the large gear, its shaft 88 and the indexing movement. This starting of the clutch and gear is effected from the controller drum through the slide rod 168 mounted in a hanger 169 secured to the floor plate 54. The upper end of this slide rod 168 is provided with a bevel top end 170 that is arranged to engage the side of the end of the lever 162 in a manner to slide against the same and shove it over by the raising of the pin. This pin is normally held down so as not to affect the said lever, by a spring 171 and its free end is distended along the outer edge of the controller drum and in the path of movement of a cam lug 172 secured to the outer face of the said controller drum.

The indexing gear 87 is provided with a notch 173 (see Figs. 6 and 9) that is cut through the inner side wall of the groove 165 and is beveled on one side so as to allow the stop pin 174 to drop in as the gear turns around and the said notch comes to register therewith. This stop pin is mounted in a bracket 175 secured to the bottom plate 54 and is provided with an upper spring 176 that serves to hold the pin up in engagement with the gear.

The pin is provided with collars against which one end of the springs operate so as to insure the aforesaid pin being held against the gear and to cause the lower spring 177 to force the short arm 178 against the controller ring 94 when the pin is shoved down. The pin thus has a slight independent movement from the arm so as to impart to it a yielding downward pressure. This arm is normally seated in a notch 179 of the bracket in which the said stop pin is operatively mounted. The arm 178 is thus caused to drop into the first one of the notches 180 of the controller ring as it comes into alinement therewith.

*Lower clutch.*—The controller clutch 181 which is mounted upon the clutch shaft 84 serves to start and stop the controller drum and is similar in construction to that designated by 157, having a depending lever 182 for engagement by lugs 183 on the controller ring. This clutch is operated from the controller ring 94 that is mounted upon the controller drum 71 and its rack and is yieldably connected to the drum by means of a spring 184 seated in a pocket 185 and having one end connected to the controller drum 71 and the other to the ring 94. These parts are so designed that the spring will expand with the preliminary engagement of the ring thus allowing a short continued movement of the drum after the ring has been engaged. The notches 180 are cut in the top edge of this ring 94 and are also designed to be engaged by the controller pin 186 slidably mounted in a bracket 187 of the face plate 50 secured to the column. A spring 188 serves to normally hold this pin in position when released for engagement with one of the notches of the ring, while the lug 189 secured to the pin may be withdrawn from the notch 190 of the hub of the plate and seated against the edge of said hub in a manner to hold the pin withdrawn from engagement with the ring at such times as it is desired to allow the ring and machine to run undisturbed.

Upon the said controller ring is secured a series of lugs 183 (see Figs. 4, 16 and 17) which are arranged at suitable distances apart and extended up so as to engage the free end of the lever 182, the other end of which is secured to and forms a part of the toggle lever mounted between the ends of the clutch band 181 secured around the clutch drum as before stated. A spring 188 serves to normally hold these ends of the band together against the clutch drum whereas the toggle lever serves to expand the band and release the drum when the said clutch and lever comes around and is engaged by one of the lugs 183 of the controller ring. As designed these parts are so constructed and arranged that the lever and clutch make eight turns to one turn of the controller ring. That is to say the end of the lever is free to swing around unobstructed seven successive times, but is engaged and held in the eighth turn of the clutch by reason of the engagement of the said lever with one of the lugs 183 of the controller ring which has now come forward in its path of movement.

*Means for stopping controller ring.*—We also provide a further connection which insures the engagement and stoppage of the controller ring when the feed slides start down thereby insuring the stoppage of the movement of the drum and parts controlled thereby. This connection will be readily understood from reference to Fig. 5, whereit will be seen that we employ a vertical slide rod 191 that is mounted in bearings 192 secured to the inside of the column and upon its lower end is provided an inwardly disposed arm 193 that extends over and in line with the notches 180 of the controller ring 94. An upper arm 194 that is also secured to each of the rods extends out and in line of movement of the tool slides 105 so that as the slides move up they engage the arm 194 and force it up and cause the inner arm 193 to be withdrawn from the notches 180 to release the controller ring 94 thereby releasing the clutch and allowing it to start, through the releasement of the clutch lever 186. When the rod 191 is raised up to release the controller ring said ring is free to move forward upon the controller drum by the action of the before mentioned spring 182 and thus serves to free the clutch lever and permit the clutch 181 to clamp and start the controller drum.

From the foregoing it will be noted that our machine has a constant relation between the rotation of table and the feed revolution of tool and that the same is accomplished through the vertical feed shaft 43 shown in Fig. 3 and which connects the driving gear of the table direct to the feed works. This feature applies to each spindle and each feed works as the carrier is rotated to bring each individual spindle into relation with the tool. The engagement of the sliding gear with the spindle gear engages the feed works with the spindle and thus it will be noted that the tool carrying heads are arranged to be fed by the revolution of the table with which they are engaged and may be operated independently or collectively to the work held on said tables.

*Description of operation.*—Assuming the front table of the machine to be loaded and the carrier ready to move forward and their respective slides returning to their top position, they disengage the controller ring through arms 193 and 194 and rod 191 and thus when the last slide reaches its upper position said ring is released which allows the controller clutch 181 to engage with its shaft thereby causing the controller drum 71 to revolve. The controller drum first draws the controller clutch 181 out of engagement with the driven shaft 84 and the lock pin 101 out of engagement with the carrier and then releases indexing clutch 158 which causes carrier 28 to move from one position to the next. While the above is taking place the arm 178 of rod 174 is forced into engagement with the notch 180 in controlling ring 94 causing it to stop until indexing is completed. When the indexing gear completes its turn then the rod falls into the notch 173 to stop the gear and release the ring. The ring immediately begins to move and throws in the clutch 158 and drum 71 which starts all down feeds for all slides. As the last one of the slides leaves its upper position the controller ring is stopped by the arm 178 dropping into a notch of the ring.

At the same time the last of the slides has been tripped off by the adjustable arm 133 secured to the depending rod 131 on the right hand side of each slide so as to reverse the clutches and feed screw in a way to run the slides up and out of the way so that the carrier may be free to turn. In this connection please note that as the respective slides come up they withdraw the arms 193 from engagement with the notches 180 of the controlling ring 94 so that when the last head and arms 193 are up and clutch lever 161 is disengaged the controlling ring is free to move ahead and start the carrier and a new cycle of operations as described. The down feed for the slides does not start until the clutches 117 and 120 are permitted to engage by the releasement of the tooth 135 of the rod 136 from the notch 134 of the link 128.

It will have been observed that an important and distinctive feature of the present invention is a controller unit and the intermittent action thereof, and in this connection it should be noted that the intermittent operation of the controller or controlling unit is essential to the rapid and accurate functioning of the parts. In fact, it is by reason of the combinations involving the controller or controlling unit, contained within the machine, that it is possible for the machine to perform work of the most exacting character and responding to all practical requirements.

Having thus described our invention what we claim and desire to secure by Letters Patent is:

1. In a multiple spindle machine, a rotary carrier having a step-by-step movement, a series of work-holding members supported on the carrier, a lesser number of tool-carrying heads arranged to be fed synchronously with the rotation of the work-carrying members to which they are related, means for independently rotating the work-carrying members, means for indexing the carrier, and an automatic controller unit for both of said means.

2. In a machine of the class described, the combination with a base, a carrier rotatably mounted thereon, a series of rotary work carrying tables supported on said carrier and the axes of which are fixed with relation to each other, a series of a lesser number of tool carrying heads arranged to be fed synchronously with the rotation of the tables with which they are engaged both independently and collectively to the work held on said tables, means for indexing the carrier so that the work tables may be brought to stations for engagement by the several tools carried by the heads and means for rotating said tables at various and independent speeds at each station.

3. In a multiple spindle machine, a revolving carrier having a step by step movement, a plurality of work-holding members supported on the carrier, a lesser number of tool-carrying heads arranged to be fed synchronously with the rotation of the tables to which they are related, means for independently rotating the work carrying members, including a plurality of revolving driving members having a stationary support, means for indexing the carrier, and means for automatically returning the tool carrying heads to their upper position.

4. In a machine of the class described, a base having an annular pocket therein and an annular opening in the top side of said pocket, a carrier rotatably mounted on said base, a series of work carrying spindles supported in said carrier and extended through the opening, gears upon each of the spindles and designed to operate in the annular pocket, means to engage and simultaneously operate the gears and spindles, a series of tool carrying slides arranged to be fed to the work held on spindles, and means for indexing the carrier so that the spindles may be successively brought into engagement with the tool heads.

5. In a machine of the class described, a base having an annular pocket therein with an annular opening in one side and a series of openings in the other side of said pocket, a carrier rotatably mounted on said base, an annular plate covering the series of openings, a series of work carrying spindles supported in said carrier and extended through the annular opening and plate, a gear upon each of the spindles and designed to operate in the annular pocket, means to engage and simultaneously operate any of the said gears and spindles, a series of tool carrying slides arranged to be fed to the work held on the work carrying spindles, and means for indexing the carrier so that any of the gears and spindles may be selectively brought into operative relation with the said operating means.

6. In a machine of the class described, the combination with a base having a series of outlet passages therein, a carrier rotatably mounted thereon, a series of hollow rotary work carrying spindles supported in said carrier and adapted to register with the outlet passages, gears upon the spindles, tool carrying slides arranged to be operated in conjunction with the work upon the spindles, means for indexing the carrier so that work may be brought into position for operation by the tools of the slides, and means to engage the spindle gears to turn the same while the carrier is in a position of rest.

7. In a machine of the class described, the combination with a base having a series of outlet passages therein, a carrier rotatably mounted thereon, a series of rotary work carrying spindles supported in said carrier and having a longitudinal opening therethrough to register with the outlet, gears upon the spindles, a driving shaft, means for connecting it with and driving all but one of said spindle gears, means for indexing the carrier upon which the spindles are mounted and so that one of the said spindles becomes disconnected from the driving mechanism with each move of the carrier.

8. In a machine of the class described, the combination with a base, a carrier rotatably mounted thereon, means for successively turning the carrier a predetermined distance, a series of work carrying tables rotatably mounted in the carrier and fixed against vertical movement, means for driving said spindles when the carrier is in a position of rest, sliding gears for disconnecting said driving means when the carrier is in motion, vertically operatable tool carrying slides arranged above the operatable position of the rotary tables, and means for feeding the slides synchronously with the rotation of the tables.

9. In a machine of the class described, the combination with a base, a carrier rotatably mounted thereon, an annular rack and gear connection for successively turning the carrier a predetermined distance, a series of work carrying tables rotatably mounted in the carrier and limited to work in the same horizontal plane, means for turning all but one of said spindles when the carrier is in a position of rest, a vertically operatable tool carrying slide arranged above the operatable spindles when in position for rotation, and means for feeding the slides to and from the operating tables synchronously with the rotation of said tables.

10. In a machine of the class described, a base, a carrier rotatably mounted on the base, means for indexing the carrier, a series of rotary non-longitudinally movable work-carrying spindles mounted in the carrier, a gear upon each of said spindles, a plurality of revolving driving spindles having a stationary support and each adapted to be temporarily connected with the gear upon one of said spindles, a change-speed gearing geared with said driving spindles, and tool-carrying means.

11. A machine tool of the class described, comprising a base, a carrier rotatably mounted thereon, means for successively rotating the carrier, a series of work carrying table spindles mounted in the carrier, a gear upon each of said spindles, a series of sliding gears with which all but one of the spindle gears are brought to register, and means for automatically shifting the sliding gears to connect and disconnect with the respective spindle gears.

12. An automatic machine tool comprising a base, a rotary carrier mounted thereon, spindles journaled in the carrier, a gear upon each of the said spindles, a cam ring connected to be rotated by the spindles, driving means, a sliding gear intermediate of the driving means and spindle gears, connections intermediate of the sliding gears and the cam ring whereby the said sliding gear is automatically shifted to disconnect the drive for the spindle gears.

13. An automatic machine tool comprising a base, a rotary carrier mounted thereon, means to successively turn the carriers a predetermined distance, spindles journaled within the carrier, a gear upon each of the said spindles, a cam ring connected to be rotated with the carrier, driving means, a sliding gear intermediate of the driving means and spindle gears, connections intermediate of the sliding gears and the cam ring whereby the said sliding gear is automatically shifted and disconnected from the spindle gears to allow the carrier to turn.

14. In an automatic machine tool, the combination of a series of rotary work carrying tables, a rotatable carrier in which the spindles are mounted, means for successively moving the carrier a predetermined distance, means for rotating the spindles, a cam ring carried by the spindles and carrier, means intermediate of the cam ring and the driving connections for the spindles whereby the spindles may be connected and disconnected to operate the spindles only when the carrier is in a position of rest.

15. In an automatic machine tool, the combination of a series of rotary work carrying tables limited to operate in the same horizontal plane a rotary carrier in which the spindles are mounted, means for successively moving the carrier a predetermined distance, means for connecting with and rotating some of the spindles when the carrier is in a position of rest, disconnecting means of the driving mechanism to insure the spindles becoming idle while the carrier moves and to insure one of the spindles being left idle while the others are in operation.

16. In a machine of the class described, the combination with a base, a driving shaft, a driven shaft, speed changing gears intermediate of the driving and driven shafts, a carrier, rotary work carrying tables mounted upon the carrier, a gear for temporarily operating the tables from the driven shafts, means for automatically connecting and disconnecting said operating gear and a series of tool carrying heads arranged to be fed synchronously with the rotation of the tables.

17. In a machine of the class described, the combination with a base, a driving shaft, a carrier, rotary work carrying tables mounted in the carrier, a driven shaft, separate speed changing gears intermediate of the driving and driven shaft to operate the spindles at separate and independent speeds, a gear for operating the table from the driven shaft, means for connecting and disconnecting said operating gear and a series of tool carrying heads arranged to be fed synchronously with the rotation of the tables.

18. In a machine of the class described, the combination with a base, a rotary carrier mounted therein, a series of outlet openings through the lower portion of the base, a series of hollow spindles bearing work carrying tables mounted in the carrier and arranged to register when in operation, with the said outlet openings so that the chips from the table may be discharged.

19. In a machine of the class described the combination with a base having an annular bearing surface with a slot therethrough, a rotary carrier mounted thereon, a series of outlet openings through the lower portion of the base, a series of hollow spindles bearing work carrying tables mounted in the carrier and extended through the slot in the base to register with the said outlet openings.

20. The combination with a base having a series of outlet openings through its lower portion, a carrier mounted thereon, a series of spindles bearing work carrying tables supported in the carrier and designed to register one with each of the said outlet openings when the carrier is in a position of rest; and means for successively moving the carrier to cause the said spindles to be moved from one outlet opening to another.

21. In a machine of the class described, the combination with a base having an annular bearing surface and an inner annular wall, a carrier rotatably mounted upon the annular bearing surface and wall of the base, a column supported upon the base and having an annular groove to overlap the upper edge portion of the carrier, and means for rotating the carrier upon the base and within the groove of the column.

22. The combination with a base having a carrier rotatably mounted thereon, an internal gear secured to the inner wall of the carrier, a pinion and shaft to operate the rack and carrier, means for driving the shaft to operate the carrier a predetermined distance, a controller drum connected with the said shaft, and connections of the controller drum for locking the carrier to the base when not in transit.

23. In a multiple spindle machine of the class described, the combination with a base, of a carrier mounted thereon, a series of spindles and tables mounted upon the carrier, a gear upon each of the said spindles, a lesser number of gears for engagement with all but one of said spindle gears, a series of sliding gears to mesh with the said lesser number of gears, a main driving shaft, adjustable speed gearing connecting the same with the said sliding gears, and means for disconnecting the said sliding gears from the spindle gears at predetermined intervals.

24. In a machine tool of the class described, the combination with a base having an upwardly extended inner annular wall and an outer annular rib, a carrier mounted thereon and having a groove to receive the rib, means for successively rotating the same, work carrying tables journaled within the carrier, a column mounted upon the inner wall of said base and having an annular flange to overhang the inner wall of the carrier and including a series of vertically arranged ways, tool carrying slides mounted upon the ways and each designed to operate in conjunction with the tables of the carrier when located therebeneath.

25. In an automatic multiple spindle machine, the combination with a base, a driving shaft, a rotary carrier mounted on the base, work carrying tables journaled in the carrier, tool carrying heads, feed works for the head, means for rotating the carrier from the feed works, and at a constant relation to the movement of the heads, means for rotating the carrier, a controlling means intermediate of the said driving shaft and the table and carrier whereby the movements of the latter may be controlled.

26. The combination with a bearing plate, of a controller drum mounted to turn thereon, means for rotating the drum, a controller ring mounted upon the drum and designed to be yieldably carried therewith, lugs carried by the ring, a clutch bearing an arm to be engaged by the lugs of the controller ring whereby the said clutch may be opened and closed.

27. In a machine of the class described, the combination with a driving shaft, a clutch shaft, variable speed gear connections between the two said shafts, a driven shaft, a clutch intermediate the driven and the driving shaft, a controller drum operated from the clutch shaft, a clutch upon the clutch shaft, connections between the controller drum and clutch for operating the latter, connections between the clutch that connects the driving and driven shaft and the controller whereby the said clutch is operated from the controller.

28. In a machine of the class described, the combination of a continuously driven shaft, a rotary controller drum arranged to be operated thereby, a clutch interposed between said shaft and drum, connections intermediate of the clutch and the controller drum whereby the said clutch is automatically operated to connect and disconnect said controller drum.

29. In a machine of the class described, the combination with a rotary carrier, of a driving shaft, a clutch on said shaft, indexing gears, connections from gears to carrier for rotating the same, a rotatable controller drum, connections between the gears and clutch for operating the drum, and connections from drum to gears for releasing the clutch.

30. In a machine of the class described, the combination of a continuously driven shaft, a rotary controller drum arranged to be operated thereby, a clutch interposed between said shaft and drum, a controller ring mounted upon the controller drum and adapted to operate the clutch to connect and disconnect said controller drum.

31. In a machine of the class described, the combination with a rotary carrier, of a main driving shaft, a driven shaft, a clutch connecting said shafts, connections from driven shaft to carrier for rotating the same, a rotatable controller drum, connections between controller drum and clutch for operating the drum, and means for driving the controller from the main shaft.

32. In a machine of the class described, the combination of a rotary carrier, rotary tables mounted therein, tool slides to operate in conjunction with the tables, a continuously driven shaft, a rotary controller drum arranged to be operated thereby, a clutch interposed between said shaft and drum, connections from drum to carrier whereby the movements of the latter is controlled by the controller drum.

33. In a machine of the class described, the combination with a rotary carrier, of a driving shaft, a clutch on said shaft, connections from shaft to carrier for rotating the same, a rotatable controller drum, connections between drum and clutch for operating same, and connections from carrier to clutch for operating same to effect the carrier.

34. In a machine of the class described, the combination of a rotary carrier, rotary tables mounted therein, tool slides to operate in conjunction with the tables, a continuously driven shaft, a rotary controller drum arranged to be operated thereby, connections from the driven shaft to carrier for rotating the same and connections from drum to carrier whereby the movement of the latter is controlled by the controller drum.

35. In a machine of the class described, the combination of a rotary carrier, rotary tables mounted therein, tool slides to operate in conjunction with the tables, a continuously driven shaft, a rotary controller drum arranged to be operated thereby, connections from the driving shaft to slides for feeding the same to the tables, and means for controlling the starting of the said feeding movement from the controller drum.

36. In a machine of the class described, the combination of a rotary carrier, rotary tables mounted therein, a driving shaft, tool slides to operate in conjunction with the tables, connections from driving shaft to carrier for rotating the same, rotatable controller drum, connections between controller drum and tables for controlling the operation of the same, and means for driving the controller from the main shaft.

37. In a machine of the class described, the combination with a rotary carrier, of a driving shaft, a clutch on said shaft, connections from clutch to carrier for rotating the same, a rotatable controller drum driven from said shaft, connections between drum and clutch for operating same, means controlled by the drum for starting and stopping the carrier.

38. The combination with a base, of a driving shaft, a rotary carrier mounted in the base, a series of rotary tables mounted in the carrier, means for rotating the majority of said tables at different and variable speeds and a lesser number of driving connections than tables to allow one of the tables to stand idle while the others are in operation.

39. The combination with a base, of a driving shaft, a rotary carrier mounted in the base, a series of rotary tables mounted in the carrier, gear connections for driving the several tables from the main shaft, and means for separately changing the speeds of the several tables to drive the same at different speeds and a lesser number of driving connections than tables so as to allow one table to stand idle while the others are in operation.

40. The combination of a base, of a carrier revolubly mounted thereon, a series of work carrying tables supported to operate in a uniform plane on said carrier, means for rotating said tables at various and independent speeds, a series of a lesser number of tool carrying slides, means for feeding said slides both independently and collectively to the work held on said tables, automatic means for returning the respective slides to their normal position, and means for simultaneously starting all the slides on their downward feed.

41. The combination with a base, of a carrier rotatably mounted thereon, a series of non-longitudinally movable but rotary work carrying tables supported in said carrier, a lesser number of driving means for rotating all but one of said tables, a lesser number of tool carrying slides than tables, connections with the rotary tables for feeding the slides to the tables, means for independently returning the slides to a position of rest, and automatic means for starting all the said slides on their downward feeding operations.

42. In a machine of the class described, the combination with a base, a carrier revolubly mounted thereon, a series of work carrying tables supported on said carrier, a series of a lesser number of vertically operatable tool carrying slides than tables, means for indexing the carrier so that the work tables may be successively brought under the respective tool slides, mechanism connecting the tables and slides for feeding all the slides to the tables, means for rotating the tables beneath the slides, a lesser number of driving connections than tables for operating all but one of the said tables with each operation of the table and slides, and means for automatically returning said slides to their upper positions.

43. In a machine of the class described, the combination with a rotary carrier, of a driving shaft, a clutch on said shaft, connections from shaft to carrier for indexing the same, a rotatable controller drum operated by the shaft, a controller ring between drum and clutch for operating same, a series of feed slides, and connections from slides to ring for locking the same while the slides are in motion.

44. In a machine of the class described, the combination with a rotary carrier, of a driving shaft, a clutch on said shaft, connections from shaft to carrier for indexing the same, a rotatable controller drum operated by the shaft, a controller ring yieldably connected thereon and adapted to rotate therewith, and means upon the ring for operating the clutch to engage and disengage the driving connections for controller drum.

45. In a machine of the class described, the combination with a rotary carrier, of a driving shaft, a clutch on said shaft, connections with clutch for indexing the carrier, a rotary controller, connections between the clutch and controller for operating the clutch by the movement of the controller and whereby the indexing of the carrier is controlled by the controller.

46. The combination with a base, of a driving shaft, a driven shaft, a clutch and brake interposed between said shafts, a rotary carrier mounted on the base, connections from driven shaft to carrier for operating the latter, a controller operated by the driven shaft, and connections from the controller for operating the clutch to start and stop the several spindles.

47. The combination with a base, of a driving shaft, a driven shaft, a clutch and brake interposed between said shafts, a rotary carrier mounted on the base, a series of feed slides, a controller operated by the driving shaft, and connections from controller for operating the clutch and brake for operating the table spindles at different speeds and for stopping the same.

48. In a machine of the class described, a feed works comprising a driving shaft, a driven shaft, clutches interposed between said shafts to operate the driven shaft either forward or backward, a feed slide connected to be operated thereby, means for automatically stopping the clutches by the movement of the slide, and means for catching and holding the said clutches in an intermediate and disengaged position.

49. In a machine of the class described, the combination with a driving shaft, a clutch shaft, a rotary carrier, an indexing shaft for operating the carrier, an indexing gear upon the indexing shaft, stop mechanism for stopping the gear and its shaft with each complete rotation thereof, and means for releasing said stop to permit of a further rotation of said gear and shaft.

50. In a machine of the class described, the combination of a driving shaft, a driven shaft, a clutch upon said shaft, a rotary carrier, an indexing shaft for operating the carrier, an indexing gear upon the indexing shaft, and connections between the gear and clutch for starting and stopping the latter.

51. In a machine of the class described, the combination with a base, of a carrier rotatably mounted on said base, a series of work carrying spindles supported on said carrier, a gear upon each of the spindles, a lesser number of gears to engage and simultaneously operate but one of the spindles and gears, a series of a lesser number of tool carrying slides arranged to be fed to the work held on the spindles, and means for indexing the carrier so that the rotatable spindles may be successively brought into engagement with the tool heads.

52. In a machine of the class described, the combination with a base, of a carrier rotatably mounted on said base, a series of work carrying spindles supported in said carrier, a gear upon each of the spindles, a lesser number of gears to engage and operate some of the said gears and spindles, a series of a lesser number of tool-carrying slides arranged to be fed to the work held on the work carrying spindles, and means for indexing the carrier so that part of but not all of the gears and spindles may be selectively brought into operative relation with the said operating means.

53. In a machine of the class described, the combination of a base, a driving shaft, a series of driving gears mounted upon the driving shaft and connected to be operated at different speeds, a carrier, rotary work carrying tables mounted in the carrier, a gear for each table, a driven shaft, a slide gear mounted upon the driven shaft and arranged to connect with either of the gears driven at different speeds, detachable connections between the table, gears and driving shaft, and means for operating said sliding gear.

54. In a machine of the class described, the combination of a base, a driving shaft, a series of driving gears mounted thereon, a driven shaft, connections for operating said gears and driven shaft at different speeds, a carrier, a series of rotary work carrying tables mounted in the carrier, gears upon the table, and separate means including a sliding gear for operatingly connecting and disconnecting the respective tables with the several driving gears and driven shaft.

55. In a machine of the class described, the combination of a base, a driving shaft, a series of driving gears mounted thereon, connections for operating said gears at different speeds, a carrier, a series of rotary work carrying tables mounted in the carrier, a series of driven shafts, and a slide gear upon each shaft and arranged to connect with any of the driving gears to drive the tables at different speeds.

56. In a machine of the class described, the combination of a base, a driving shaft, a series of driving gears mounted upon the driving shaft, speed change gearing to operate said driving gears at different speeds, a series of rotary work carrying tables, driven shafts, slide gears mounted upon the driven shafts and means for connecting the slide gears with any of the driving gears.

57. The combination with a base, of a carrier rotatably mounted thereon, means for successively turning the carrier predetermined distances, a rotary controller, means for locking the said carrier to the base against rotation at the completion of each movement of the carrier and connections from controller for operating the locking device.

58. The combination with a base, of a carrier rotatably mounted thereon, means for operating said carrier successively at a constant speed, a rotary controller, means for successively operating the same at a constant speed, means for controlling the operation of the carrier by the controller and means for operatively connecting and disconnecting the controller.

59. The combination with a base, of a carrier rotatably mounted thereon, means for operating the carrier at a constant speed, a rotary controller operated at a constant but greater speed, means for operatively connecting and disconnecting the controller, and means for starting and stopping the operation of the carrier by the controller.

60. The combination with a base, of a carrier rotatably mounted thereon, means for operating the carrier at a constant speed, a rotary controller operated at a constant but greater speed, means for operatively connecting and disconnecting the controller, a series of rotary work carrying tables mounted in the carrier, means for driving the tables at various and independent speeds, and separate means for controlling the operation of both the carrier and tables by the controller.

61. In a machine of the class described, the combination of a base, a rotary carrier mounted thereon, rotary tables mounted in the carrier, tool slides to operate in conjunction with the tables, means for operating the carrier tables and slides, a rotary controller, and connection from said controller with each the carrier tables and slides for starting and stopping the same at predetermined distances.

62. In a machine of the class described, the combination with a base, a rotary carrier mounted thereon rotary tables mounted in the carrier, means for operating the carrier and tables, a rotary controller for starting and stopping the carrier and tables, and manual means for stopping the controller.

63. In a machine of the class described, the combination of a base, a rotary carrier mounted thereon, rotary tables mounted in the carrier, tool slides to operate in conjunction with the tables, means for operating the carrier tables and slides, a rotary controller for starting and stopping the rotary tables and slides, and manual means for stopping the controller.

64. In a multiple spindle machine, a revolving carrier having a step by step movement, a plurality of revolving driving spindles having a stationary support, a plurality of work-holding spindles mounted in said carrier to revolve therewith and encircling said driving spindles and geared thereto to be revolved thereby, means for operating said spindles at variable speeds, and a tool carrying means having a reciprocating movement toward and from said work-holding spindles.

65. In a multiple spindle machine, a plurality of driving spindles having a stationary support, a revolving work carrier having a step by step movement around said spindles, a plurality of work-holding spindles mounted in said carrier at a uniform distance from the axis thereof and from one another, said driving spindles having gearing whereby one or more of them may be stationary and all the others driven simultaneously, said work-carrying spindles being geared to and encircling said driving spindles to be revolved successively thereby only during the stationary or intermediate periods between the steps of said work carrier, the stationary period of each work-carrying spindle, when opposite the stationary driving spindle, permitting the convenient mounting or removal of the work, and a series of reciprocating slides having cutting tools supported opposite and registering with said work-carrying spindles.

66. The combination, with a revolving carrier having an intermittent movement, of a central gear drive, a plurality of work-carrying spindles mounted in said carrier and having gears thereon, a number of driving spindles mounted in fixed bearings between said central gear drive, and said work-carrying spindles and having an operative connection continuously with said central drive and intermittently with said work-carrying spindle gears.

67. The combination with a revolving carrier having an intermittent movement, of a central drive, a plurality of driving spindles having a stationary support and variable speed driving connections with said central drive, a number of work-carrying spindles mounted in said carrier to revolve therewith around said driving spindles, gears for said work-carrying spindles, driving connections between said driving spindles and said work-carrying spindles for operating the latter during the stationary periods of said carrier, the gears of said work carrying spindles being operatively disconnected from the driving spindles during the indexing of the carrier.

68. The combination, with the revolving carrier having an intermittent movement, of a central drive, a plurality of driving spindles mounted in fixed bearings and uniformly spaced apart around said central drive, a plurality of work-carrying spindles mounted in the said carrier to revolve therewith, an operative connection between the driving spindles, and the work-carrying spindles, a change-speed gearing operatively connecting the central drive with said driving spindles, the said work-carrying spindles being adapted to pass out of driving connection with said driving spindles and being stationary on their own axes during the movement of the carrier.

69. The combination, with a revolving carrier having an intermittent movement, of central driving gears, driving spindles, an operative connection between each driving spindle and one of the work-carrying spindles, a change speed gear connection between the central driving gears and all of the driving spindles, means for actuating said operative connections and said change speed gearing for revolving any of said work-carrying spindles independently of the other spindle at the same or different speeds, or allowing said spindles to remain stationary on their axes during the revolution of the carrier.

70. A multiple spindle machine comprising a revolving work-carrier having a plurality of chucking positions or stations, a central driving gear, a plurality of driving spindles having a stationary support and driving connections with said central driving gear, a number of work-supporting spindles geared to said driving spindles and mounted in said carrier to revolve therewith around said driving spindles and on their own axes, means causing said work-carrying spindles to be out of driving connection with the driving spindles between chucking positions, and means causing each work-carrying spindle to be temporarily stationary on its axis in a predetermined chucking position and to revolve on its axis in other chucking positions.

71. The combination, with a base, of a revolving carrier mounted thereon, a plurality of spindles mounted in said carrier, a driving mechanism therefor, said spindles having a change speed gearing including gears of different sizes, shafts mounted in said base and operatively connected with said gearing, each of said shafts having an operating handle whereby the change gears for any spindle can be shifted independently of the corresponding gears of the other spindles.

72. The combination, with a revolving work-carrier of a reciprocating tool carrier, a central guide column for said reciprocating tool carrier, a normally stationary stop in the path of said tool carrier for limiting the movement thereof toward said work carrier, a reversing mechanism coöperating with said stop, and a controller unit for the reversing mechanism.

73. The combination, with a revolving work carrier operating in a horizontal plane, of a vertically reciprocating tool carrier, a tool holder supported thereby, a guide column for said reciprocating tool carrier, a stop in the path of said tool carrier for limiting the movement thereof toward said work carrier, a reversing mechanism coöperating with said stop, and a controller unit for the reversing mechanism.

74. The combination, with a base and an upright column thereon, of a carrier mounted to revolve on said base concentric with said column, a plurality of work-carrying spindles mounted in said carrier to revolve therewith, tool carriers mounted to slide vertically on said column and having tool holders to register with said spindles, a stop in the path of said tool carrier for limiting the downward movement thereof, a reversing mechanism coöperating with said stop, and a controller unit for the reversing mechanism.

75. The combination, with a base and an upright column thereon, of a carrier mounted to revolve on said base concentric with said column, a plurality of work-carrying spindles mounted in said carrier to revolve therewith, tool carriers mounted to slide vertically on said column and having tool holders to register with said spindles, adjustable stops in the path of said tool carriers for limiting the downward movement thereof, a reversing mechanism coöperating with said stops, and a controller unit for said reversing mechanism.

76. A machine of the class described including a rotary carrier, having a step by step movement, a plurality of rotatable work holding members supported by the carrier, a change speed gearing, means coöperating with said gearing for rotating said work holding members at varying and independent speeds at each station, and tool carrying means.

77. A machine of the class described including a rotary carrier, a plurality of rotatable work holding members supported by the carrier, a change speed gearing unit, a separate driving connection, for each work holding member, actuated from said gearing unit, selective means coöperating with said driving connections and the gearing unit for permitting the work holding members to be operated at varying and independent speeds at each station, and tool carrying means.

78. A machine of the class described including a rotary carrier, a plurality of work holding members supported by the carrier, a change speed gearing unit having a common drive, a separate selective transmission connection at each working station for each work holding member, and tool carrying means.

79. A machine of the class described including a rotary carrier, a plurality of independent rotatable work holding members supported by the carrier, a single change speed gearing unit having a common drive, a manually selective transmission connection at each working station for each work holding member and operated from the change speed gearing unit, and tool carrying means.

80. A machine of the class described including a rotary carrier, a plurality of independent rotatable work-holding members supported by the carrier, a change speed gearing unit having a common drive, a selective transmission connection at each working station for each work holding member, whereby said members may be operated at varying and independent speeds at each station, and means for automatically rendering said transmission connections operative and inoperative.

81. A machine of the class described including a rotary carrier, a plurality of independent rotatable work-holding members supported by the carrier, a change-speed gearing unit, a separate selective transmission connection for each work-holding member at each working station whereby the work holding members may be operated at varying and independent speeds at each station, and means, controlled by the movement of the carrier, for rendering said transmission connections operative and inoperative.

82. A machine of the class described including a rotary carrier, a plurality of independent rotatable work holding members supported by the carrier, a common central drive gearing, a transmission connection between the drive gearing and each work-holding member at each working station, and means, actuated by the movement of the carrier, for rendering the transmission connections inoperative during the indexing movement of the carrier.

83. In a machine of the class described including a rotary carrier, a plurality of work-holding spindles mounted in the carrier and each having a gear, a sliding gear arranged at each working station and adapted to engage and disengage said spindle gear, means for driving all of the sliding gears, and tool carrying means.

84. A machine of the class described including a rotary carrier, a plurality of work-holding spindles mounted in the carrier and each having a gear, a sliding gear arranged at each working station and adapted to engage and disengage said spindle gear, change-speed-gearing for driving the sliding gears, and tool-carrying means.

85. A machine of the class described including a rotary carrier, a plurality of work-holding spindles mounted in the carrier and each having a gear, a sliding gear arranged at each working station and adapted to engage and disengage said spindle gear, means for driving all of the sliding gears, means for automatically shifting said sliding gears, and tool-carrying means.

86. A machine of the class described including a rotary carrier, a plurality of work-holding spindles mounted in the carrier and each having a gear, a sliding gear arranged at each working station and adapted to engage and disengage said spindle gear, means for driving all of the sliding gears, cam-means, affected by the indexing of the carrier, for automatically shifting the sliding gears, and tool-carrying means.

87. A machine of the class described including a rotatable member carrying a plurality of independently rotatable work-holders, a lesser number of tool-holders to provide a loading station, means for intermittently advancing said member, and means for rotating the work-holders at varying and independent speeds at each working station.

88. A machine of the class described including a rotatable member carrying a plurality of independently rotatable work-holders, means for indexing said member, means for independently rotating the work-holders, and an automatic intermittent controller unit for both of said means.

89. A machine of the class described including a rotatable member carrying a plurality of independently rotatable work-holders, means for indexing said member, means for independently rotating the work-holders at variable speeds, and an automatic intermittently operative controller unit for both of said means.

90. A machine of the class described including a rotatable member carrying a plurality of independently rotatable work holders, means for indexing said member, tool carrying means, a reversing mechanism for the tool carrying means, and an automatic controller unit for both said indexing means and said reversing mechanism.

91. A machine of the class described including a rotatable member carrying a plurality of independently rotatable work-holders, means for indexing said member, means for independently rotating the work-holders, tool-carrying means, a reversing mechanism for the tool-carrying means, and an automatic controller unit common to and controlling the indexing means, the reversing mechanism, and the driving means for the work-holders.

92. A machine of the class described including a rotatable member carrying a plurality of independently rotatable work-holders, means for indexing said member, a locking device for said member, drive means for the work-holders, tool-carrying means, a reversing mechanism for the tool-carrying means, and an automatic controller unit common to and controlling said indexing means, said locking device, said drive means, and said reversing mechanism.

93. A machine of the class described including a rotatable member carrying the work-holders, means for indexing the said member, means for locking the said member when not in transit, and an automatic controller unit common to and controlling both of said means.

94. A machine of the class described including a rotatable member carrying the work-holders, operating means for said member including a clutch, and a controller unit including a yieldable element operatively related to said clutch.

95. A machine of the class described including a rotatable member carrying the work-holders, operating means for said member including a clutch, and a controller unit having a yieldable ring operatively related to the said clutch.

96. A machine of the class described including a rotatable member carrying the work-holders, operating means for said member including a clutch, and an intermittent controller unit having a yieldable ring operatively related to the said clutch.

97. A machine of the class described including a rotatable member carrying the work-holders, operating means therefor, a plurality of clutches interposed in the line of said operating means, and an intermittent common controller unit for said clutches.

98. A machine of the class described including a rotatable member carrying the work-holders, indexing means for said member, driving means for the work-holder, a plurality of clutches interposed in the line of the indexing means and driving means, and an intermittent common controller unit for said clutches.

99. A machine of the class described including a rotatable member carrying the work-holders, tool carrying means associated with each working station, indexing means for the rotatable member, driving means for the work holder, reversible feed works for each tool carrier, and an intermittent controller unit operatively affecting all of said means and said feed works.

100. A machine of the class described including a rotatable member carrying the work-holders, indexing means for said member, driving means for the work-holders, tool-carrying means associated with each working station, reversible feed works for each tool carrier, a plurality of clutches included in the line of the operating parts of all of said means and said feed works, and an intermittent controller unit for all of said clutches.

101. A machine of the class described including a rotatable member carrying the work-holders, a plurality of tool-carrying slides, means for feeding said slides both independently and collectively, and automatic means for returning all of said slides to normal position.

102. A machine of the class described including a rotatable member carrying the work-holders, a plurality of tool-carrying slides, means for feeding the slides, and means for automatically and independently returning each slide to normal position.

103. A machine of the class described including a rotatable member carrying the work-holders, a plurality of tool-carrying slides, means for simultaneously initiating the feeding movement of all of the slides, and means for automatically and independently returning each slide to normal position.

104. A machine of the class described including a rotatable member carrying the work-holders, means for operating said member, a rotary intermittent controller, means for controlling the indexing of the said member by the said controller, and means for operatively connecting and disconnecting the controller.

105. A machine of the class described including a rotatable member carrying the work-holders, operating means for said member, an intermittent rotary controller, means affected by said controller for indexing said member, and manual means for stopping the controller.

106. A machine of the class described including a rotatable member, work holders carried for independent rotation by said member, separate operating means for the rotatable member and the work-holders, an intermittent rotary controller, means affected by the said controller for controlling said separate operating means, and means for stopping and starting the controller.

107. A machine of the class described including a rotatable member carrying a plurality of independently operable work-holders, a lesser number of tool-holders than work-holders to provide an accessible loading station, separate operating means for advancing the rotatable member and for operating said work holders, and an intermittently operative controller unit for both of said means.

Signed at Bridgeport in the county of Fairfield and State of Connecticut this 7th day of January A. D., 1914.

EDWARD P. BULLARD, Jr.
WILLIAM N. STEVENS.

Witnesses:
JOHN D. McLEOD,
HARRY L. OVIATT.